United States Patent [19]

Hoven

[11] 3,798,382

[45] Mar. 19, 1974

[54] VOICE-MONITORING CONTROL CIRCUIT

[75] Inventor: El Don L. Hoven, Lake Oswego, Oreg.

[73] Assignee: Ford Industries, Inc., Portland, Oreg.

[22] Filed: May 22, 1972

[21] Appl. No.: 255,730

[52] U.S. Cl. .............................. 179/81 R, 179/6 R

[51] Int. Cl. .......................................... H04m 1/00

[58] Field of Search ........ 179/81 R, 84 C, 84 L, 88, 179/89, 7.1 R, 2 TC, 18 BE, 170.2, 170.6, 179/170.8, 6 R, 6 C, 6 E, 1 VC

[56] References Cited

UNITED STATES PATENTS

| | | | |
|---|---|---|---|
| 2,946,852 | 7/1960 | Brown | 179/6 R |
| 3,573,378 | 4/1971 | Leyburn | 179/7.1 R |
| 2,864,889 | 12/1958 | O'Dwyer | 179/6 R |
| 3,716,674 | 2/1973 | Manos | 179/18 FA |
| 3,366,778 | 1/1968 | De Stefano | 179/18 EB |
| 3,688,044 | 8/1972 | Konno | 179/6 R |
| 3,590,161 | 6/1971 | Jacobs | 179/7.1 R |

FOREIGN PATENTS OR APPLICATIONS

| | | | |
|---|---|---|---|
| 1,176,448 | 1/1970 | Great Britain | 179/1 SA |

OTHER PUBLICATIONS

Pulse, Digital, and Switching Waveforms, by Millman and Taub, 1965, pp. 669,684.

*Primary Examiner*—Kathleen H. Claffy
*Assistant Examiner*—Alan Faber
*Attorney, Agent, or Firm*—Kolisch, Hartwell & Dickinson

[57] ABSTRACT

A circuit for assuring automatic breaking of a talking connection in a telephone line a preselected time interval after talking has ceased on the line. The circuit has particular ultility in connection with apparatus such as a call diverter, or a telephone answering and message-recording device. The circuit includes a digital-type counting circuit which is fed pulses to be counted, and which effects breaking of a talking connection on reaching a certain count. A frequency-sensitive circuit responsive to a limited range of voice frequencies (found to recur frequently in normal male and female conversation) monitors voice frequencies on the line, and on sensing a frequency within such range, effects resetting of the counting circuit to a zero-count condition to prevent breaking of a talking connection.

5 Claims, 2 Drawing Figures

PATENTED MAR 19 1974 3,798,382

SHEET 1 OF 2

VOICE-MONITORING CONTROL CIRCUIT

BACKGROUND AND SUMMARY OF THE INVENTION

This invention pertains to a voice-monitoring control circuit, and more particularly, to such a circuit for assuring automatic breaking of a talking connection in a telephone line a preselected time interval after talking has ceased on the line. A preferred embodiment of the invention is disclosed herein in connection with call diverter apparatus with which the invention has been found to have particular utility.

The usual call diverter functions to couple a pair of telephone lines for the purpose of diverting a call which comes in one one of the lines to the other line on which may be dialed the number where the called party may be reached. With such apparatus, it is important that at the completion of such a diverted telephone call, talking connections in the two telephone lines connected to the apparatus be broken to assure readiness properly to handle the next incoming call.

A general object of the present invention is to provide a novel voice-monitoring control circuit for reliably assuring such breaking of talking connections.

Another object of the invention is to provide such a control circuit which effcts breaking of a talking connection a predictable time interval after talking has ceased on a line.

According to a preferred embodiment of the invention, the proposed circuit employs a digital-type counting circuit which is fed pulses to be counted, and which is operatively connected to line-seizure switch means to effect opening of a talking circuit on reaching a predetermined count of pulses. Also included in the control circuit is a frequency-sensitive circuit which is responsive to a limited range of voice frequencies which have been found to recur frequently in normal male and female conversation. This frequency-sensitive circuit monitors voice frequencies in a telephone conversation, and on sensing a frequency within such range, causes resetting of the counting circuit to a zero-count condition as an indication that talking is still continuing.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

Figure 1:
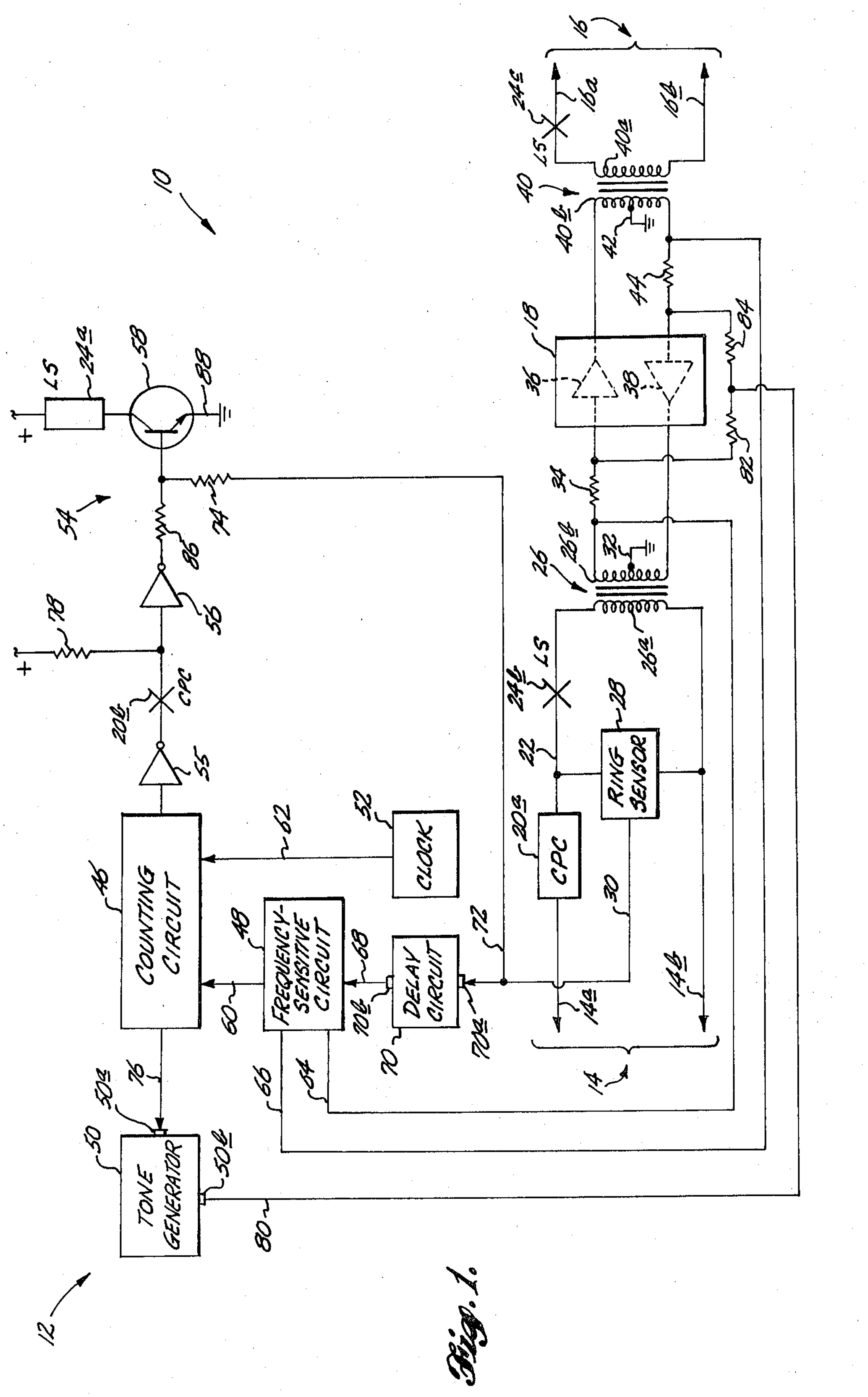
FIG. 1 is a combined circuit and block diagram illustrating portions of a telephone call diverter employing a control circuit as contemplated by the invention.

Explaining briefly certain terminology which will be used in the description which follows, various components shown in the drawings operate in response to a pair of voltage levels. More specifically, one of these levels corresponds to a certain positive voltage (typically about '3 volts) which will be referred to hereinafter as a "1" state. The other level corresponds to ground, and will be called hereinafter a "0" state. A terminal, or a conductor, having one of these voltage levels on it will be referred to as being in or having on it, either a 1 or a 0 state.

Turning now to the drawings, and referring first to FIG. 1, indicated generally at 10 is a telephone call diverter employing, among other things, a voice-monitoring control circuit 12 constructed in accordance with the present invention. Call diverter 10 is connected to a pair of telephone lines, shown generally at 14, 16, and is adapted, when set to operate automatically, to divert an incoming call on line 14 to line 16 over which the appropriate telephone number is automatically dialed to reach the call diverter's owner. Various types of apparatus may be used in the call diverter for enabling changeable selection, and automatic dialing out, of such a number where the owner may be reached when he is away from the location of the call diverter. Such apparatus forms no part of the present invention, and therefore is not disclosed in detail herein. For the purpose of the present description, such apparatus may be considered to be contained within block 18 in FIG. 1. An example of one type of apparatus suitable for the purpose just generally described is fully disclosed in U.S. Pat. No. 3,301,961 to M. A. Odom.

Telephone lines 14, 16 include conductors **14*a*, 14*b* and 16*a*, 16*b*, respectively. Considering line 14, conductor 14*a* connects with conductor 14*b* through the coil 20*a* of a Calling-Party-Control (CPC) relay, a conductor 22, a normally open contact 24*b* of a Line-Seizure (LS) relay, and a winding 26*a* of a hybrid coupling transformer 26. The Calling-Party-Control and Line-Seizure relays, and the hybrid coupling transformer, are conventional components widely used in telephone systems. For simplicity in the drawings herein, the two relays mentioned are shown in what might be thought of as separated-element form, with their respective coils and contacts distributed in the drawings as required for such simplicity. Included in the Calling-Party-Control relay, and actuated by coil 20*a*, is a normally open contact shown at 20*b*. Further, the Line-Seizure relay includes another normally open contact shown at 24*c*—contacts 24*b*, 24*c* in this relay being actuated by Line-Seizure relay coil 24*a***.

Indicated generally in block form at 28 in FIG. 1 is a ring sensor circuit whose input terminals are connected to conductor 22 and to conductor **14*b*. The internal construction of this circuit is conventional, and thus is not shown in detail. In the absence of ringing current in telephone line 14, circuit 28 maintains a 0 state voltage on its output terminal which is connected to a conductor 30. When ringing current flows in this line, however, circuit 28** applies a 1 state to its output terminal for the duration of ringing.

The other winding **26*b* in transformer 26 is center-tapped and grounded at 32, and has its opposite ends connected to various components in block 18. More specifically, the upper end of winding 26*b* in FIG. 1 connects through a resistor 34 to the input terminal of an audio amplifier 36, shown in dashed triangular outline inside block 18. The bottom end of winding 26*b* is connected directly to the output terminal of another audio amplifier, 38, also shown in side block 18.**

Indicated at 40 in FIG. 1, is another hybrid transformer which is substantially the same in construction as transformer 26. Transformer 40 includes windings **40*a*, 40*b*, the latter being center tapped and grounded at 42. The upper end of winding 40*b* in FIG. 1 connects with the output terminal of amplifier 36. The lower end of winding 40*b* connects through a resistor 44 with the input terminal of amplifier 38. The upper end of winding 40*a* connects through contact 24*c* with conductor 16*a*. The lower end of this winding is connected directly to conductor 16*b*.**

Included in control circuit 12 are a counting circuit 46, a frequency-sensitive circuit 48, a conventional tone generator 50, and a conventional 10 Hertz clock, or supply of electrical pulses, 52. Further included in the control circuit is a switching circuit 54 comprising conventional inverters 55, 56 and a transistor 58. Tone generator 50 includes an input terminal 50a and an output terminal **50*b*. With a 1 state existing on its input terminal, no output tone is supplied at its output terminal. However, with a 0 state applied to terminal 50*a*, generator 50** supplies a tone at a frequency of about 1,400 Hertz at its output terminal.

The output terminal of frequency-sensitive circuit 48 is connected through a conductor 60 to what is referred to herein as the reset input terminal of counting circuit 46. Clock 52 is connected through a conductor 62 to what is referred to as the counting input terminal in circuit 46. The frequency-sensitive circuit has one of its input terminals connected through a conductor 64 to the junction between winding **26*b* and resistor 34, another of its input terminals connected through a conductor 66 to the junction between winding 40*b* and resistor 44. Still another input terminal in circuit 48 is connected through a conductor 68 to the output terminal 70*b* of a conventional delay circuit shown in block form at 70.**

Previously mentioned conductor 30 connects the output terminal of ring sensor 28 both to the input terminal **70*a* of delay circuit 70, and through a conductor 72 and a resistor 74 to the base of transistor 58.**

With a 0 state on input terminal **70*a*, a 1 state exists on output terminal 70*b*. On a 1 state being applied momentarily to terminal 70*a*, circuit 70** applies a 0 to its output terminal for a time period of about 50 seconds, whereupon a 1 state is then returned to the output terminal.

Counting circuit 46 includes a pair of output terminals, one being connected through a conductor 76 to the input terminal of tone generator 50, and the other being connected through inverter 55 to one side of relay contact **20*b*, the other side of which connects with the input terminal of inverter 56. Positive voltage, from any suitable source thereof, is supplied the input terminal of this inverter through a biasing resistor 78.**

Completing a description of what is shown in FIG. 1, the output terminal of tone generator 50 is connected through a conductor 80, and through resistors 82, 84 to the junctions between resistors 34 and amplifier 36, and resistor 44 and amplifier 38, respectively. The output terminal of inverter 56 is connected through a resistor 86 to the base of transistor 58. The emitter of this transistor is grounded at 88, and the collector of the transistor is connected through relay coil **24*a*** to the source of positive voltage mentioned above.

Figure 2:
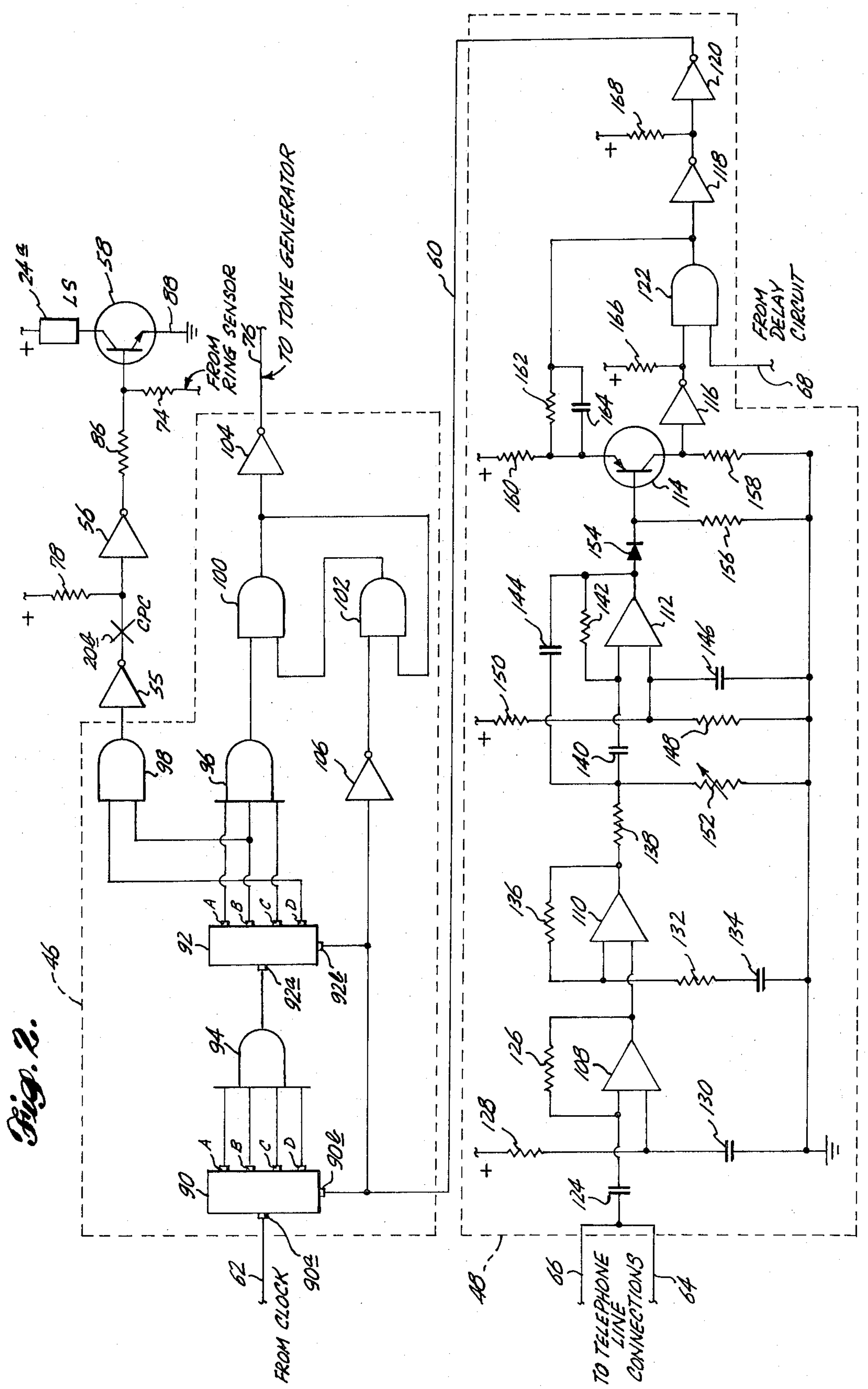
FIG. 2 is a circuit diagram further illustrating details of the proposed control circuit.

Considering FIG. 2 along with FIG. 1, counting circuit 46 includes two four-bit digital counters 90, 92, a four-input NAND gate 94, a three-input NAND gate 96, and three two-input NAND gates 98, 100, 102. Also included in the counting circuit are two inverters shown at 104, 106. All of these components are conventional devices.

Counters 90, 92 include counting input terminals **90*a*, 92*a*, and reset input terminals 90*b*, 92*b*,** respectively. In addition, each of these counters includes four output terminals indicated by the letters A, B, C, D. The two counters are substantially identical in construction, and explaining briefly how each performs, with a 0 state existing on the reset input terminal of the counter, each negative-going edge of a square-wave voltage pulse applied to the counting input terminal in the counter results in a change of voltage state on one or more of the output terminals in the counter. With a 1 state applied to the reset input terminal, the counter automatically resets instantaneously and directly to a zero-count condition. Table I below indicates that respective voltage states which exist on the different output terminals in each of these counters for a given count condition stored in the counter.

TABLE I

| Counted Pulse | States of Output Terminals A | B | C | D |
|---|---|---|---|---|
| 0 (Zero-count condition) | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

Pulses for initiating operation in the counters are supplied by clock 52 to the counting input terminal of counter 90 via conductor 62. With call diverter 10 in an operative condition, clock 52 runs continuously.

Each of the five NAND gates in circuit 46 functions as follows: With a 0 state on any input terminal of the gate, the output terminal thereof is held in a 1 state; with all input terminals in 1 states, the output terminal is placed in a 0 state.

The four output terminals of counter 90 are each connected to a different input terminal in gate 94. The output terminal of gate 94 is connected to counting input terminal **92*a* in counter 92. Output terminals A, B, C in counter 92 are each connected to a different input terminal in gate 96. Output terminal D in counter 92 is connected to the upper input terminal in gate 98—the lower input terminal in this gate being connected to output terminal B in counter 92.**

The output terminal of gate 98 is connected to the input terminal of previously mentioned inverter 55. The output terminal of gate 96 is connected to the upper input terminal of gate 100. The other input terminal of gate 100 is connected to the output terminal of gate 102, and the output terminal of gate 100 is connected to the input terminal of inverter 104. The output terminal of this inverter connects with previously mentioned conductor 76. Also connected to the output terminal of gate 100 is the lower input terminal of gate 102. The upper input terminal of this gate is connected to the output terminal of inverter 106, whose input terminal is connected to previously mentioned conductor 60, and to reset input terminals 90*b*, 92*b* in the counters.

Frequency-sensitive circuit 48 includes three operational amplifiers indicated at 108, 110, 112, a transistor 114, three inverters 116, 118, 120, and a two-input NAND gate 122. The inverters and the NAND gate are similar in construction to the corresponding devices described in counting circuit 46. The three operational amplifiers are conventional devices, and are substantially the same as one another in construction. An operational amplifier which has been found to perform well in the circuit illustrated in FIG. 2 is one made by Motorola, designated MC1741CP.

Previously mentioned conductors 64, 66 are connected as shown through a capacitor 124 to the inverting (upper) input terminal of amplifier 108. A feedback resistor 126 interconnects this input terminal and the output terminal of the amplifier. The noninverting (lower) input terminal of amplifier 108 is connected through a resistor 128 to the source of positive voltage mentioned earlier, and also is connected through a capacitor 130 to ground.

The output terminal of amplifier 108 is connected directly to the noninverting input terminal of amplifier 110. The inverting input terminal of this amplifier is connected to ground through the series combination of a resistor 132 and a capacitor 134, and also is connected to the output terminal of the amplifier through a feedback resistor 136. Amplifiers 108, 110, connected as shown, function as an amplitude-limiting amplifier stage in circuit 48.

The output terminal of amplifier 110 is connected through the series combination of a resistor 138 and a capacitor 140 to the inverting input terminal of amplifier 112. The output terminal of this amplifier is connected through a feedback resistor 142 to the inverting input terminal, and through a capacitor 144 to the junction between resistor 138 and capacitor 140. The noninverting input terminal of amplifier 112 is connected to ground through the parallel combination of a capacitor 146 and a resistor 148, and also is connected to the source of positive voltage mentioned through a resistor 150. An adjustable resistor 152 interconnects the junction between resistors 138, 140 and ground.

Amplifier 112, connected as shown, performs as an active filter—passing a narrow band of audio frequencies from about 840 Hertz to about 920 Hertz. This limited range of frequencies has been selected as one which has been found to contain frequencies that recur in normal male and female conversation. Further, the range has been chosen to avoid other, nonconversation, frequencies (such as ringing, noise, etc.) which occur at times over the usual telephone line.

The output terminal of amplifier 112 is connected through a diode 154 to the base of transistor 114. This base is also connected to ground through a resistor 156. The collector of transistor 114 is connected to ground through a resistor 158, and the emitter of the transistor is connected through a resistor 160 to the positive voltage source. The emitter of the transistor is also connected through the parallel combination of a resistor 162 and a capacitor 164 to the conductor shown connecting the output terminal of gate 122 with the input terminal of inverter 118. The upper input terminal of gate 122 is connected through a resistor 166 to the positive voltage source, and also is connected to the output terminal of inverter 116. The input terminal of inverter 116 is connected directly to the collector of transistor 114. The lower input terminal of gate 122 is connected to previously mentioned conductor 68.

Completing a description of what is shown in FIG. 2, the output terminal of inverter 118 is connected directly to the input terminal of inverter 120, and also is connected through a resistor 168 to the positive voltage source. The output terminal of gate 120 is connected to previously mentioned conductor 60.

Explaining now how the apparatus described herein performs, let us assume initially that call diverter 10 is in a condition awaiting an incoming call on telephone line 14. Under such circumstances, ring sensor circuit 28 is in a condition with a 0 state on its output terminal, clock 52 is running, and de-lay circuit 70 is in a condition with a 1 state on its output terminal. Further, transistor 58 is in a nonconducting state, and the Line-Seizure and Calling-Party-Control coils, 24*a*, 20*a*, respectively, are nonenergized. As a consequence, contacts 20*b*, 24*b*, 24*c* are open, and no talking connection exists in either of the two telephone lines.

Inside of frequency-sensitive circuit 48, transistor 114 is in a nonconducting state, and gate 122 and inverters 116, 118, 120 are in such conditions that a 0 state exists on conductor 60. As a consequence, counters 90, 92 are counting pulses coming from clock 52. However, because of the fact that no incoming call has yet been received over line 14, and because no talking connections are established in lines 14, 16, operations of the counters at this time is of no particular consequence.

On a call coming in over line 14, ringing current flows in the line, and is sensed by circuit 28, which then places a 1 state on its output terminal. With this occurring, transistor 58 switches into conduction, and delay circuit 70 enters a condition placing a 0 state on its output terminal for the time period mentioned earlier. With a 0 state thus placed on output terminal 70*b*, the output terminal of gate 122 switches into a 1 state, the output terminal of inverter 118 switches into a 0 state, and the output terminal of inverter 120 switches into a 1 state. Such action results in counters 90, 92 being reset to, and held in, zero-count conditions, whereupon they do not respond to pulses from the clock. This situation remains until the output terminal of delay circuit 70 returns to a 1 state condition.

With the counters thus reset, the output terminals of gates 96, 98, 102, and of inverter 104, are placed in 1 states, and the output terminals of gate 100 and of inverter 106 are placed in 0 states. With the output terminal of inverter 104 in a 1 state, tone generator 50 is off. With the output terminal of gate 98 in a 1 state, the output terminal of inverter 55 is placed in a 0 state.

With turning on of transistor 58, as mentioned above, Line-Seizure coil 24*a* is energized and closes contacts 24*b*, 24*c* to establish talking connections in lines 14, 16, respectively. Closure of contact 24*b* permits sufficient current to flow in line 14 to energize Calling-Party-Control coil 20*a*, whereupon contact 20*b* closes. And, with closure of contact 20*b*, a 0 state voltage is applied from the output terminal of inverter 55 to the input terminal of inverter 56, whereupon the output terminal of the latter is placed in a 1 state to maintain conduction in transistor 58.

At this time, other apparatus (not shown) in the call diverter effects automatic dialing out on line 16 of the appropriate telephone number where the called party may be reached. The particular manner in which this is accomplished is in no way critical to the present invention. The 50-second delay period afforded by circuit 70 accommodates such dialing out, and subsequent ringing, of the "diverted-to" telephone number.

At the end of the approximately 50-second time period during which delay circuit 70 maintains its output terminal in a 0 state, this output terminal is returned to a 1 state condition. On this occurring, the voltage states at the output terminals of gate 122 and of inverters 118, 120 change, whereupon a 0 state is returned to conductor 60 to permit counters 90, 92 again to begin counting. At this time, operation of the counters has significance.

Each pulse supplied then by clock 52 is counted in counter 90, and on each sixteenth count thus recorded, the output terminal of gate 94 is switched momentarily into a 0 state to cause a count to be registered in counter 92. With the clock rate mentioned earlier, it will be apprent that every 1.6 seconds a new count is registered in counter 92.

In the absence of any talking occurring over lines 14, 16, this situation—with counters 90, 92 counting pulses—continues, as will now be described. More specifically, on the seventh consecutive count being registered in counter 92, the output terminal of gate 96 is placed in a 0 state, whereupon the output terminals of gate 100 and of inverter 104 are placed in 1 and 0 states, respectively. In addition, the output terminal of gate 102 is placed in a 0 state, which results in the output terminals of gate 100 and inverter 104 locking into the states just mentioned. On this occurring, tone generator 50 operates to feed a tone to lines 14, 16. It will be noted that initiation of this tone herein occurs 11.2 seconds after the renewing of counting in counters 90, 92.

In the event that still no talking occurs over lines 14, 16, counting continues in the counters. On the tenth count being recorded in counter 92, which occurs 16 seconds after renewing of counting in the counters, the output terminal of gate 98 is placed in a 0 state. And on this occurring, a 0 state voltage is applied to the base of transistor 58, which then causes this transistor to turn off. As a consequence, Line-Seizure coil **24*a* deenergizes, contacts 24*b*, 24*c* reopen, Calling-Party-Control coil 20*a* deenergizes, and contact 20*b* reopens. With such action, talking connections in lines 14, 16 are broken, and the call diverter is returned to a condition awaiting another incoming call over line 14.**

Tone generator 50 continues operating until the next ringing signal occurs in line 14. When such takes place, and with resetting of the counters at that time, the output terminal of inverter 104 is returned to a 1 state condition, whereupon the tone generator turns off.

It will thus be apparent that, after the establishment of talking connections in lines 14, 16, in the absence of talking over these lines for a period of about 11.2 seconds, a tone from generator 50 is placed on these lines to warn that a short time thereafter, if no talking occurs, the talking connections will be broken. Further, it will be seen that in the arrangement described herein, 16 seconds without talking over the lines results in automatic breaking of the talking connections.

However, if at any time up to the breaking of talking connections talking does occur over either of the lines, this is fed into frequency-sensitive circuit 48 via capacitor 124. Experience has shown that such talking will, in all probability, contain a frequency within the responsive range of the active filter (mentioned earlier) employing operational amplifier 112. On this occurring, amplifier 112 places a sufficiently negative voltage on the base of transistor 114 to turn this transistor momentarily on. With turning on of transistor 114, the output terminal of inverter 116 is placed in 0 state, the output terminal of gate 122 is placed in a 1 state, and the output terminals of inverters 118, 120 are placed in 0 and 1 states, respectively. A 1 state voltage will thus be applied momentarily to conductor 60, whereupon the counters will reset to zero-count conditions, and will begin all over again counting pulses.

Thus, so long as time gaps in talking over lines 14, 16 do not equal 16 seconds, talking connections will be maintained in these lines. However, should a time gap equal 16 seconds, talking connections will automatically be broken.

It will thus be apparent that the circuit of the invention reliably and predictably effects automatic breaking of talking connections in telephone lines when talking over these lines has stopped for a preselected time period. The exact length of this time period is, of course, a matter of choice. Further, it will be noted that the proposed circuit provides a warning tone prior to breaking of talking connections at a known time interval before disconnection will occur.

With the active filter which includes operational amplifier 112 tuned to the relatively narrow band of voice frequencies mentioned, and with such frequencies being quite different from other frequencies (i.e., ringing, spurious noise, etc.) which occur at times over the usual telephone line, the circuit of the invention responds reliably substantially only to talking occurring over a telephone line.

While a preferred embodiment of the invention has been described, it is appreciated that variations and modifications may be made without departing from its spirit.

It is claimed and desired to secure by Letters Patent:

1. A voice-monitoring control circuit for use in combination with electrical switch means connected to a telephone line, where the switch means when closed establishes a talking connection in the line, and when opened breaks such a connection, said control circuit in operative condition comprising a supply of regularly recurring electrical pulses, an electronic digital counting circuit operatively connected to said supply and to said switch means for counting pulses supplied by the former and for effecting, when said switch means is closed, opening thereof on the count of such pulses reaching a predetermined count, said counting circuit being constructed for instantaneous, direct resetting to a zero-count condition from any above-zero count condition, and a frequency-sensitive circuit responsive to a narrow band of voice audio frequencies and operatively connected to said telephone line and to said counting circuit, said frequency-sensitive circuit effecting instantaneous, direct resetting of said counting circuit to a zero-count condition on each different occurrence in said telephone line, with a talking connection existing therein, of a voice audio frequency within said band.

2. The control circuit of claim 1 which further comprises a tone generator operatively connected to said counting circuit and to said telephone line, operable to place a tone on the latter on the count in the former reaching another predetermined count which is less than said first-mentioned predetermined count.

3. A voice-monitoring control circuit for use in combination with apparatus for diverting a call from a first telephone line to a second telephone line, where there is an electrical switch means connected to at least one of said lines which when closed establishes a talking connection in such line, and when opened breaks such a connection, said control circuit in operative condition comprising a supply of regularly recurring electrical pulses, an electronic digital counting circuit operatively connected to said supply and to said switch means for counting pulses supplied by the former and for effecting, when said switch means is closed, opening thereof on the count of such pulses reaching a predetermined count, said counting circuit being constructed for instantaneous, direct resetting to a zero-count condition from any above-zero count condition, and a frequency-sensitive circuit responsive to a narrow band of voice audio frequencies and operatively connected to both of said telephone lines and to said counting circuit, said frequency-sensitive circuit effecting instantaneous, direct resetting of said counting circuit to a zero-count condition on each different occurrence in either of said lines, with a talking connection existing in said one line, of a voice audio frequency within said band.

4. The control circuit of claim 3, wherein said switch means is connected to said first telephone line.

5. The control circuit of claim 3 which further comprises a tone generator operatively connected to said counting circuit and to said telephone lines, operable to place a tone on each of the latter on the count in the former reaching another predetermined count which is less than said first-mentioned predetermined count.

* * * * *